Jan. 12, 1971    P. C. ANDERSON ET AL    3,554,018
TENDEROMETER

Filed June 11, 1969    2 Sheets-Sheet 1

United States Patent Office 3,554,018
Patented Jan. 12, 1971

3,554,018
TENDEROMETER
Philip C. Anderson, Crete, Nebr., and Donald Buhmann, Cedar Falls, and Norman Hinkel, Waterloo, Iowa, assignors to Feed Service Corporation, Crete, Nebr., a corporation of Nebraska
Filed June 11, 1969, Ser. No. 832,261
Int. Cl. G01n 3/48; A22b 5/00
U.S. Cl. 73—81
6 Claims

ABSTRACT OF THE DISCLOSURE

The present invention relates to an apparatus for determining, with accuracy and reproducibility, the tenderness of a material, and more particularly, to an apparatus for the determining of the tenderness of the meat of an animal carcass. The apparatus, which cuts a small sample of such material, has a circular cutter having at least two, and more particularly three, relatively dull blades. The depth of penetration of the blades in the sample, which is sensed and indicated by the apparatus, is indicative of the tenderness of the material from which the sample was removed.

BACKGROUND OF THE INVENTION

It has been found that many prior art meat tenderness testing apparatus have certain undesirable features and characteristics which limit their general utility. Many of these apparatus have complicated mechanisms susceptible to high friction losses and breakdown. Other prior art apparatus have many sensitive electrical and mechanical adjustments requiring extensive maintenance. Still others are adversely influenced by environmental factors such as temperature or fluctuations in input voltage. Furthermore, and most importantly, none of the prior art apparatus appears to yield accurate and reproducible meat tenderness testing results.

SUMMARY OF THE INVENTION

This invention relates to an apparatus for determining, with accuracy and reproducibility, the tenderness of a material, and more particularly, to an apparatus for determining the tenderness of the meat of an animal carcass.

It was discovered in the past and was the subject of various patents (e.g., U.S. Pats. 3,214,967 and 3,264,866 both to Bouschart et al.) (1) that differences in meat tenderness can be determined by suitably instrumented dull knife device and (2) that there is a reasonable correlation between a tenderness rating by such a device and an organoleptic or chew test.

The apparatus of the present invention involves the use of a rotary circular cutter having more than two, and more particularly three, equally spaced blades. Each of these blades has relatively dull cutting portions.

The cutter is removably attached to a vertical shaft of an electro-mechanical device. The shaft, which has rotary motion imparted to by driving means, is also permitted to move, substantially free of friction, along its lengthwise axis. The lengthwise axis of the shaft is perpendicular to the base of the apparatus upon which the sample of the material is placed for cutting by the cutter. A constant force biasing means biases the shaft downwardly thereby maintaining a constant force between the cutter and the sample while the sample is being cut.

It has also been found that using the cutter of the present invention, and in particular, using the cutter having three equally spaced blades, produces highly accurate and reproducible tenderness measurements. The use of such a cutter obviates the need for an adjunct to the cutter such as a follower. A follower for the cutter has been required in the past to support the wall of the cut so it doesn't fall back into the cut and be recut. Such recutting of the sample will yield inaccurate tenderness measurements.

It has been further found that a cutter having three relatively dull, equally spaced blades provides blades with a length to width ratio particularly suited for determining the tenderness of the meat of an animal and more specifically the meat of a carcass of beef.

It has also been found that providing a vertical, constant force biased rotary shaft that can move, substantially free of friction, along its lengthwise axis results in an apparatus capable of yielding accurate and reproducible tenderness testing results.

Accordingly, an object of the present invention is to provide an apparatus for determining the tenderness of a material, having a circular cutter with more than two blades, each of the blades having relatively dull cutting portions, the cutter being adapted to make a rotary cut in a material, the penetration of the cut being indicative of the tenderness of the material.

A further object of this invention is to provide an apparatus, for determining the tenderness of a material, said apparatus having a vertical constant force biased rotary shaft that can move, substantially free of friction, along its lengthwise axis.

Yet another object of this invention is to provide an apparatus, for determining the tenderness of the meat of an animal carcass, said apparatus having a circular cutter with three blades, each of the blades having relatively dull cutting portions, the cutter being adapted to make a rotary cut in a sample of the animal carcass, the depth of cut being indicative of the tenderness of the meat of the animal carcass.

These and other objects and advantages of this invention will become apparent from the following detailed description when taken with the accompanying drawings.

BRIEF DESCRIPTION OF THE DRAWINGS

In the drawings, where like characters of reference are applied in the several below-described views, to indicate corresponding parts.

DETAILED DESCRIPTION OF THE INVENTION

Figure 1:
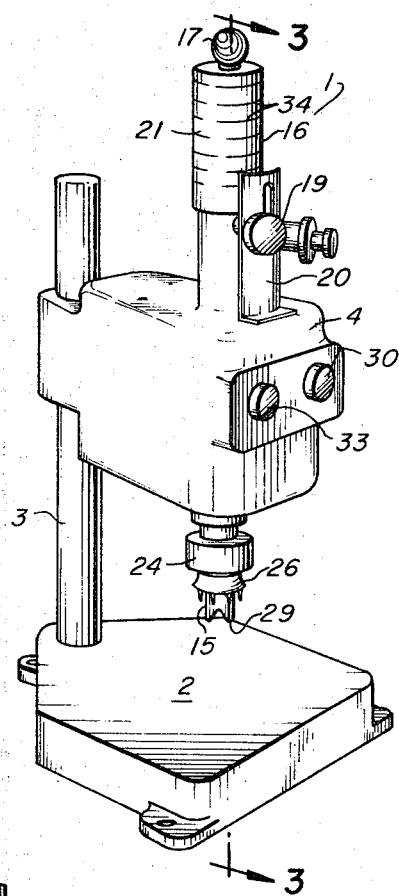
FIG. 1 is a perspective view looking at the front of the the apparatus embodying a presently-preferred embodiment of the present invention.
Figure 2A:
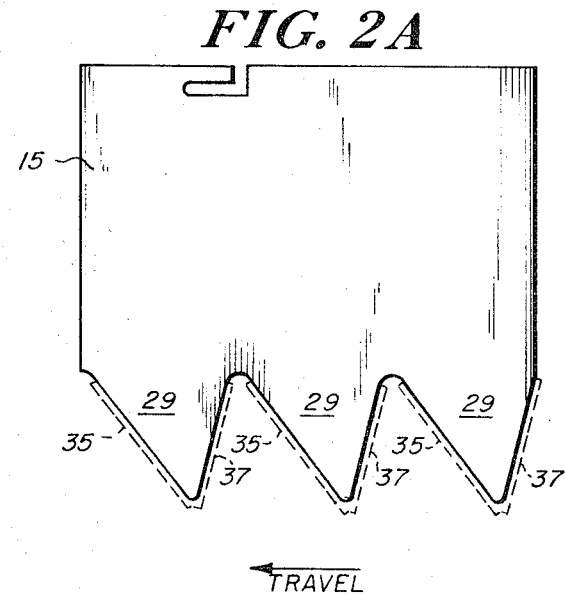
FIG. 2A shows the cutter edge portion developed or flattened.
Figure 2:
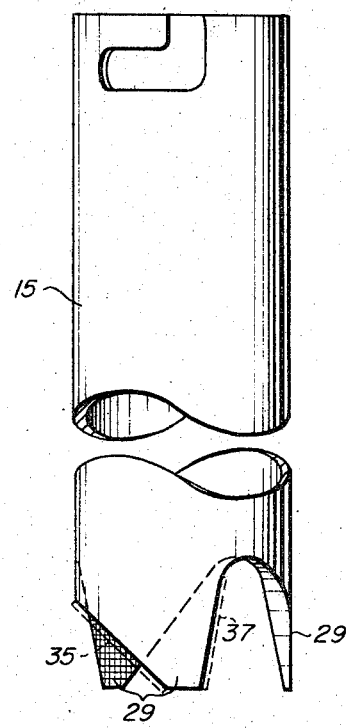
FIG. 2 is a side elevational view of the cutter adapted to cooperate with the device of FIG. 1.
Figure 3:
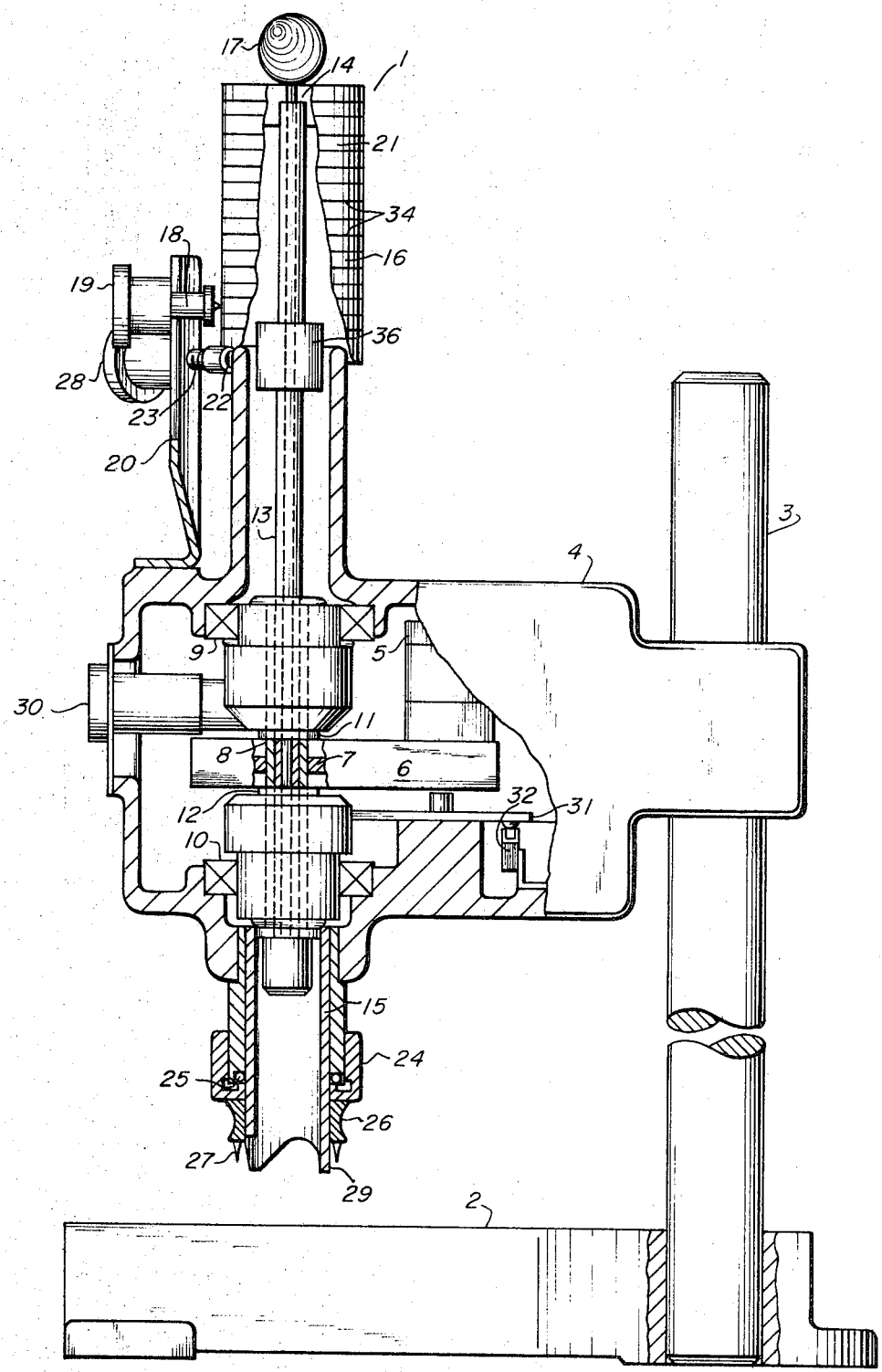
FIG. 3 is an axial sectional view when looking at the right side of the front of the device of FIG. 1, taken along line 3—3, with parts broken away and parts shown in elevation.

Referring now to FIGS. 1 to 3, inclusive, wherein there is shown a tenderometer 1 having a base 2 fixedly secured to a vertical column 3 by means such as a set screw. A housing 4 is fixedly secured to the column 3 also by means such as set screws. The base 2 is adapted to rest on a horizontal surface such as a work bench or table top. A desirably synchronous gearhead motor 5 is mounted within the housing 4 and fixedly secured to a gear reduction box 6 by screw fastening means.

The output shaft (not shown) of the motor 5 is coupled through reducing gears 7 (other gears not shown) to a hollow internally and longitudinally slotted drive means 8. The drive means 8, which may be the outer race of a commercially available Saginaw Bearing is supported within the housing 4 by ball bearings 9 and 10. The reducing gears 7 are disposed within and rotationally carried by the gear reduction box 6 and said gear reduction box 6 is fitted with positioning sleeves 11 and 12 which maintain the axial position of the gear reduction box 6 relative to the driving means 8. The driving means 8 imparts rotary motion to a longitudinally slotted drive shaft 13, the drive shaft 13 being disposed within the driving means 8 and the slots of drive shaft 13 slidably engaging the slots of the driving means 8 thereby permitting the drive shaft to move substantially free of friction along its lengthwise axis.

A weight 14 is fixedly attached to one end of the drive shaft 13 thereby biasing the drive shaft 13 vertically downward toward the base 2. A circular cutter 15 is removably attached to the other ends of the drive shaft 13 by means of a bayonnet type joint. The cutter 15 can be easily removed for cleaning or replacement by disconnecting it from the shaft 13 at the bayonnet joint. The biasing force of the weight 14 maintains a substantially constant force between the attached cutter 15 and any material which is cut by the cutter. The weight 14 forms the closed end of a drum 15 which is fixedly attached to said shaft 13. A knob 17 is fixedly attached to the drive shaft 13 and is adapted to upwardly lift the drive shaft 13-weight 14-drum 16-cutter 15 assembly.

The recording mechanism for the device includes the above drum 16, a scribe 18, the scribe being mounted on a bracket 20 which is fixedly attached to the housing 4.

The scribe 18, which is biased by a spring (not shown) toward the drum is fixedly attached to a scribe knob 19. Rotating the scribe knob 19 retracts the scribe away from the drum by a camming action of the knob 19 on the bracket 20. A pressure sensitive carbonless paper chart 21, such as commercially available from NCR Corporation, is placed on the drum 16. The drum 16, with the chart 21 attached thereon, moves axially and rotationally with the cutter 15 during the cutting operation, while the scribe 18 remains fixed with respect to said drum 16 and accordingly makes a trace on the chart 21.

Also mounted on the bracket 20 is a stop pin 22. The pin 22 is biased by a spring 23 toward the drum and is fixedly attached to a stop pin knob 28. Before a cutting operation is begun the knob 17 is lifted upwardly until the stop pin 22 engages the bottom of the drum thereby holding it in the up position (FIGS. 1 and 3 show the apparatus with the drum 16 in the up position).

The sample to be cut (not shown) by the cutter 15 is positioned thereunder and a squeeze ring 24, which is threadedly attached to the lower end of the housing 4, is rotated so that the O-ring 25 is decompressed, thereby permitting a cylindrical shaft 26 with prongs 27 to be lowered into and engage the sample. The squeeze ring 24 is then tightened compressing or squeezing the O-ring 25 which holds the cylindrical shaft 26 in place thereby securing the sample in position on the base 2.

The stop pin 22 is then retracted by rotating the stop pin knob which through a camming action between the knob 28 and the bracket 20 moves the pin 22 away from the drum.

The shaft 13 being downwardly biased by the weights 14 moves vertically downward thereby bringing the blades 29 of the cutter 15 in contact with the sample.

A first push button power switch 30 is pressed, energizing the electric motor 5 through a conventional electric circuit which is connected to line voltage through the switch 30. The electric motor 5 is programmed by programming means including a cycle control gear 31 which is rotationally attached to the housing and adapted to rotationally engage the driving means 8. The control gear 31 senses the revolutions of the driving means 8 and through a conventional electrical circuit opens and closes a micro switch 32 which in turn starts and stops the electrical motor.

While the electrical motor 5 could be programmed to make any number of revolutions the motor 5 in the present embodiment is programmed to make 1 revolution thereby making 1 circular cut in the sample.

After the cutter has made 1 revolution, the scribe 18 is set to engage the chart 21 and thereby mark it at a point on the chart 21 labeled "start."

A second push button power switch 33 is pressed again energizing the electric motor 5 which is then programmed by the programming means to rotate the drive shaft 13 through an additional 7 turns thereby further cutting the sample. As the shaft 13 turns and the cutter 15 cuts the sample a continuous line is formed on the chart 21 by the scribe 18. The distance from the start point on the chart 21 to the highest point reached by the scribe 18, which is determined by the vertical depth of cut of the blades 29 of the cutter 15 into the sample, is indicative of the tenderness of the sample. A travel stop 36 is fixedly attached to shaft 13 to limit the vertical downward travel of said shaft 13.

The chart 21 may have horizontal "grading" lines 34 which may indicate various grades of tenderness. The chart 21, which may be removed from the drum 16 after the test, can serve as a permanent record of the test results.

While the apparatus of the present invention is suited for testing the tenderness of any appropriate material it has been found that it is particularly suited for the testing of the tenderness of the meat of an animal carcass.

A preferred circular cutter 15 suited for cutting samples of an animal carcass and particularly suited for cutting a prepared sample and in particular the ventricular heart muscle removed from the cardiac region of a carcass of beef is illustrated in FIGS. 2 and 2A. In FIG. 2A the cutter of FIG. 2 is slit and opened up on a plane surface.

The cutting direction of the cutter 15 FIG. 2 is clockwise and in FIG. 2A the cutting direction is to the left as indicated by the arrow. Each of the 3 blades 29 of the circular cutter 15 have equally spaced relatively dull cutting portions shown at 35 and relief portions shown at 37. Proceeding to the right from the topmost portion of each of the blades 29, the blades 29 drop sharply to provide a trailing edge portion 37. The trailing edge portion 37 of each blade 29 cooperates with the cutting portion 37 of the next blade 29 whereby the wall of the cut in the sample made by the cutter 15 is maintained and does not fall into the cut and be recut.

It has been found that inaccurate tenderness test results will occur if the wall of a cut is permitted to be recut by a cutter.

The cutter 15 obviates the need for an auxiliary part such as a follower to maintain the wall of the cut. Such auxiliary parts usually reduce the accuracy of the test results by adding additional elements to the cutting operation.

Tests have been performed using the present invention wherein a section of the ventricular heart muscle was removed from various carcasses of beef. The muscle was prepared and then cut by the above described apparatus, at two locations, side by side. The test results yield correlation coefficients, determined in accordance with standard statistical methods, above .94±.015. That is, the tenderness test reproducibility was .94±.015.

The muscle may be prepared in various ways such as freeze-drying, aging, fixing or any combination thereof. The preferred method of preparation is to cook the muscle enwrapped in a plastic bag at 158° F. in a constant temperature liquid bath until the muscle itself reaches 158° F. The muscle is then containerized and cut by the apparatus of the invention.

Having now described our invention in detail, those skilled in this art will have no difficulty in making changes and modifications in order to meet specific requirements or conditions. Such changes and modifications may be made without departing from the spirit and scope of the invention.

We claim

1. Apparatus for determining the tenderness of a material having a dull cutter, means for successively passing the cutter along a pre-determined circular path on the material under test to cut said material, means for maintaining a substantially constant force between the cutter and the material during each cutting pass, means for sensing and indicating the depth of penetration of said cutter into said material and the number of rotations causing said penetration wherein the improvement comprises a circular cutter having more than two equally spaced blades, each of said blades having relatively gradually rising dull cutting portions dropping sharply at the trailing edge portions of said blades whereby the trailing edge portion of each blade cooperates with the cutting portion of the next succeeding blade so that the wall of the cut made by said blades in said material is maintained and not recut by said blades.

2. Apparatus according to claim 1, wherein said cutter is a hollow cylinder having three blades formed at the edge portion of said hollow cylinder.

3. Apparatus according to claim 2, wherein said material is meat.

4. Apparatus according to claim 3, wherein said meat is a small sample of the ventricular heart muscle of a carcass of beef.

5. An instrument for determining the tenderness of the meat of an animal carcass comprising a horizontal base, a vertical column fixedly attached to said base, a housing fixedly attached to said column, an electric motor having a geared output shaft rotationally being coupled to a vertical hollow driving means through reduction gear means, said driving means having internal longitudinal slots, said driving means rotationally fixed in said housing at bearings mounted in said housing, said reduction gear means disposed within a gear housing and said gear housing disposed within said housing and carried by said housing, said motor fixedly attached to said gear housing, a vertical drive shaft having external longitudinal slots, said drive shaft slidably engaging said driving means whereby rotary motion is transmitted to said drive shaft while permitting it to move, substantially free of friction, along its lengthwise axis which is vertical to said base, a hollow circular cutter having relatively dull blades connected to said shaft at the end nearest the base, said shaft being weighted at its other end downwardly biasing said drive shaft thereby maintaining a constant force between said cutter and a sample of said carcass being cut on said base, electrical control means for said electrical motor for determining the number of rotary cuts said cutter makes in said sample, a drum carried by said shaft at its weighted end, holding means to mount recording paper on said drum, a stylus carried by a bracket fixedly attached to said housing, said stylus adapted to record the vertical depth of penetration of said cut in said sample, said vertical depth of penetration being indicative of the tenderness of the meat of said animal carcass.

6. An instrument for determining the tenderness of the meat of an animal carcass according to claim 5, wherein said cutter has three equally spaced blades.

References Cited
UNITED STATES PATENTS

| | | | |
|---|---|---|---|
| 2,743,750 | 5/1956 | Wilson | 146—52X |
| 3,214,967 | 11/1965 | Bouschart et al. | 73—81 |
| 3,264,866 | 8/1966 | Bouschart et al. | 73—104X |
| 3,374,696 | 3/1968 | Trevatlan | 77—69 |

RICHARD C. QUEISSER, Primary Examiner

E. J. KOCH, Assistant Examiner

U.S. Cl. X.R.

17—1